United States Patent
Fichter et al.

(10) Patent No.: US 10,715,864 B2
(45) Date of Patent: Jul. 14, 2020

(54) SYSTEM AND METHOD FOR UNIVERSAL, PLAYER-INDEPENDENT MEASUREMENT OF CONSUMER-ONLINE-VIDEO CONSUMPTION BEHAVIORS

(71) Applicant: Oracle America, Inc., Redwood Shores, CA (US)

(72) Inventors: Daniel E. Fichter, New York, NY (US); Christopher R. Tsoufakis, Salt Lake City, UT (US); Nikki K. Gomez, Brooklyn, NY (US); Aniq Rahman, New York, NY (US); Jonah Goodhart, New York, NY (US); Michael Garrett Seiler, Scarsdale, NY (US); Suryansh Agarwal, West Orange, NJ (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 14/213,443

(22) Filed: Mar. 14, 2014

(65) Prior Publication Data

US 2017/0318339 A1    Nov. 2, 2017

Related U.S. Application Data

(60) Provisional application No. 61/785,912, filed on Mar. 14, 2013.

(51) Int. Cl.
*H04N 21/442* (2011.01)
*H04N 21/258* (2011.01)
(Continued)

(52) U.S. Cl.
CPC ... *H04N 21/44204* (2013.01); *H04N 21/2225* (2013.01); *H04N 21/25866* (2013.01);
(Continued)

(58) Field of Classification Search
CPC .......... H04N 21/4104; H04N 21/4667; H04N 21/466; H04N 21/44222; H04N 7/163;
(Continued)

(56) References Cited

U.S. PATENT DOCUMENTS

| | | |
|---|---|---|
| 6,108,637 A | 8/2000 | Blumenau |
| 6,115,680 A | 9/2000 | Coffee |

(Continued)

OTHER PUBLICATIONS

WELOVED, "WebDesignServed," May 19, 2010, 2 pages, http://www.webdesignserved.com.
(Continued)

*Primary Examiner* — Brian T Pendleton
*Assistant Examiner* — Alan H Luong
(74) *Attorney, Agent, or Firm* — Kilpatrick Townsend & Stockton LLP

(57) ABSTRACT

A system that is an independent measurement system to gauge video consumption or viewing is disclosed. Methods for formulating a universal set of measurements or metrics that is operable across all video players, video-content types, ad (advertisement) networks, display devices, and browsers is also disclosed. This set of measurement or metrics advantageously is configured to operate consistently and equally well regardless of the particular video player, video-content type, network, display devices, and browsers that are used.

19 Claims, 9 Drawing Sheets

(51) Int. Cl.
*H04N 21/2225* (2011.01)
*H04N 21/81* (2011.01)
*H04N 21/4782* (2011.01)

(52) U.S. Cl.
CPC ... *H04N 21/44222* (2013.01); *H04N 21/4782* (2013.01); *H04N 21/812* (2013.01)

(58) Field of Classification Search
CPC .............. G06Q 30/00; G06Q 30/0272; G06Q 30/0277; G06Q 30/02; G06Q 30/0242; G06Q 30/0248
USPC ..................................... 725/9, 39; 705/14.73
See application file for complete search history.

(56) References Cited

U.S. PATENT DOCUMENTS

| | | | |
|---|---|---|---|
| 6,151,608 A | 11/2000 | Abrams | |
| 6,230,204 B1 | 5/2001 | Fleming, III | |
| 6,327,619 B1 | 12/2001 | Blumenau | |
| 6,418,470 B2 | 7/2002 | Blumenau | |
| 6,778,982 B1 | 8/2004 | Knight et al. | |
| 7,263,497 B1 | 8/2007 | Wiser et al. | |
| 7,310,609 B2 | 12/2007 | Middleton, III et al. | |
| 7,386,473 B2 | 6/2008 | Blumenau | |
| 7,613,635 B2 | 11/2009 | Blumenau | |
| 7,660,737 B1 | 2/2010 | Lim et al. | |
| 7,716,326 B2 | 5/2010 | Blumenau | |
| 7,756,974 B2 | 7/2010 | Blumenau | |
| 7,917,755 B1 | 3/2011 | Giliyaru | |
| 8,108,245 B1 | 1/2012 | Hosea | |
| 8,190,604 B2 | 5/2012 | Wen et al. | |
| 8,255,491 B1 | 8/2012 | Arzur | |
| 8,266,115 B1 | 9/2012 | Park | |
| 8,386,314 B2 | 2/2013 | Kirby et al. | |
| 8,508,532 B1 | 8/2013 | Logan | |
| 8,544,050 B2* | 9/2013 | Brown | H04N 7/17318 725/110 |
| 8,554,938 B2* | 10/2013 | Mittal | H04N 21/41407 709/230 |
| 8,799,103 B1 | 8/2014 | Federighi | |
| 8,880,996 B1 | 11/2014 | Deshpande | |
| 9,282,048 B1 | 3/2016 | Fichter et al. | |
| 2002/0098891 A1 | 7/2002 | Graham et al. | |
| 2002/0103698 A1 | 8/2002 | Cantrell | |
| 2002/0111865 A1 | 8/2002 | Middleton, III | |
| 2002/0138331 A1 | 9/2002 | Hosea et al. | |
| 2002/0165773 A1 | 11/2002 | Natsuno et al. | |
| 2003/0122966 A1* | 7/2003 | Markman | G11B 27/105 348/563 |
| 2003/0200145 A1 | 10/2003 | Krassner et al. | |
| 2005/0210533 A1 | 9/2005 | Copeland et al. | |
| 2005/0235030 A1 | 10/2005 | Lauckhart et al. | |
| 2006/0026063 A1* | 2/2006 | Collins | 705/14 |
| 2006/0080681 A1 | 4/2006 | Anwar et al. | |
| 2007/0039018 A1 | 2/2007 | Saslow et al. | |
| 2007/0050251 A1 | 3/2007 | Jain et al. | |
| 2007/0067267 A1 | 3/2007 | Ives | |
| 2007/0255702 A1 | 11/2007 | Orme | |
| 2007/0266305 A1 | 11/2007 | Cong et al. | |
| 2008/0004958 A1 | 1/2008 | Ralph et al. | |
| 2008/0114709 A1 | 5/2008 | Dixon | |
| 2008/0120165 A1 | 5/2008 | Yan | |
| 2008/0320125 A1 | 12/2008 | O'Sullivan et al. | |
| 2009/0003704 A1* | 1/2009 | Hwang | G06F 16/957 382/181 |
| 2009/0076899 A1 | 3/2009 | Gbodimowo | |
| 2009/0150500 A1 | 6/2009 | Kumar et al. | |
| 2009/0157813 A1* | 6/2009 | Jung | A61B 5/04842 709/204 |
| 2009/0187546 A1 | 7/2009 | Hamilton Whyte | |
| 2009/0216621 A1 | 8/2009 | Anderson | |
| 2009/0265243 A1 | 10/2009 | Karassner et al. | |
| 2009/0271260 A1 | 10/2009 | Sharma et al. | |
| 2009/0300528 A1 | 12/2009 | Stambaugh | |
| 2010/0023868 A1 | 1/2010 | Bonforte et al. | |
| 2010/0095317 A1* | 4/2010 | Toebes | H04N 7/163 725/9 |
| 2010/0121676 A1 | 5/2010 | Jackson | |
| 2010/0146380 A1 | 6/2010 | Rousso et al. | |
| 2010/0153996 A1* | 6/2010 | Migos | G06F 3/0425 725/39 |
| 2010/0169792 A1 | 7/2010 | Ascar et al. | |
| 2010/0198697 A1 | 8/2010 | Brown et al. | |
| 2010/0241597 A1 | 9/2010 | Chen et al. | |
| 2010/0251128 A1 | 9/2010 | Cordasco | |
| 2010/0287054 A1 | 11/2010 | Zohar et al. | |
| 2010/0293031 A1 | 11/2010 | Jacobs et al. | |
| 2010/0295774 A1 | 11/2010 | Hennessey | |
| 2010/0310175 A1 | 12/2010 | Holt | |
| 2011/0029393 A1* | 2/2011 | Apprendi | G06Q 30/0277 705/14.73 |
| 2011/0069940 A1* | 3/2011 | Shimy | G11B 27/105 386/296 |
| 2011/0072131 A1 | 3/2011 | Zohar et al. | |
| 2011/0087966 A1 | 4/2011 | Leviathan | |
| 2011/0125587 A1 | 5/2011 | Netzer et al. | |
| 2011/0137737 A1* | 6/2011 | Baird | G06Q 30/0272 705/14.73 |
| 2011/0163971 A1 | 7/2011 | Wagner et al. | |
| 2011/0239243 A1 | 9/2011 | Dierks et al. | |
| 2011/0246267 A1 | 10/2011 | Williams et al. | |
| 2011/0246879 A1 | 10/2011 | White et al. | |
| 2011/0320286 A1 | 12/2011 | Zohar et al. | |
| 2012/0078707 A1 | 3/2012 | Ramakrishnan et al. | |
| 2012/0106793 A1 | 5/2012 | Gershenson et al. | |
| 2012/0239489 A1 | 9/2012 | Peretti et al. | |
| 2012/0284738 A1 | 11/2012 | Narasimhan et al. | |
| 2012/0317472 A1 | 12/2012 | Chernysh | |
| 2012/0324098 A1 | 12/2012 | De Jager et al. | |
| 2013/0031470 A1 | 1/2013 | Daly, Jr. et al. | |
| 2013/0124342 A1 | 5/2013 | Virkar et al. | |
| 2013/0145384 A1 | 6/2013 | Krum et al. | |
| 2013/0173765 A1* | 7/2013 | Korbecki | H04N 21/42209 709/221 |
| 2013/0179767 A1 | 7/2013 | Bajric et al. | |
| 2013/0205314 A1* | 8/2013 | Ramaswamy | H04N 21/44213 725/14 |
| 2013/0238423 A1 | 9/2013 | Pottjegort | |
| 2013/0335576 A1 | 12/2013 | Gotschlich | |
| 2014/0040786 A1* | 2/2014 | Swanson | G06F 16/957 715/760 |
| 2014/0108562 A1* | 4/2014 | Panzer | G06Q 10/10 709/206 |
| 2014/0181634 A1 | 6/2014 | Compain | |
| 2014/0278993 A1 | 9/2014 | Massoudi et al. | |
| 2014/0282642 A1* | 9/2014 | Needham et al. | 725/10 |
| 2015/0066940 A1* | 3/2015 | Fernandes | G06F 17/30867 707/740 |
| 2017/0316092 A1 | 11/2017 | Fichter et al. | |
| 2017/0316462 A1 | 11/2017 | McConnell et al. | |
| 2017/0316467 A1 | 11/2017 | Seiler et al. | |

OTHER PUBLICATIONS

WELOVED.com WELOVEAD, dated Mar. 7, 2011, 14 pages, http://web.archive.org/web/20110307041600/http://www.welovead.com/en/works/database.

Minimizing CPU Usage, Adobe Flash Platform, Available on internet at https://web.archive.org/web/20111018064811/http://help.adobe.com/en_US/as3/mobile/WS4bebcd66a74275c36cfb813724318eebc6-8000.html, Oct. 18, 2010.

Timing it right, Tinic Uro, Available on internet at http://www.kaourantin.net/2010/03/timing-it-right.html, 2010.

U.S. Appl. No. 13/945,851, Final Office Action dated Feb. 23, 2018, 13 pages.

U.S. Appl. No. 13/945,851, Final Office Action dated Jan. 15, 2016, 23 pages.

U.S. Appl. No. 13/945,851, Non-Final Office Action dated Apr. 9, 2015, 12 pages.

(56) References Cited

OTHER PUBLICATIONS

U.S. Appl. No. 13/945,851, Non-Final Office Action dated Jun. 30, 2017, 19 pages.
U.S. Appl. No. 14/032,019, Final Office Action dated May 9, 2016, 20 pages.
U.S. Appl. No. 14/032,019, Non-Final Office Action dated Oct. 7, 2015, 14 pages.
U.S. Appl. No. 14/032,019, Non-Final Office Action dated Aug. 16, 2017, 15 pages.
U.S. Appl. No. 14/213,360, Advisory Action dated May 26, 2017, 4 pages.
U.S. Appl. No. 14/213,360, Final Office Action dated Mar. 15, 2017, 18 pages.
U.S. Appl. No. 14/213,360, Non-Final Office Action dated Jul. 13, 2016, 14 pages.
U.S. Appl. No. 14/213,360, Non-Final Office Action dated Feb. 5, 2018, 25 pages.
U.S. Appl. No. 14/032,019, Final Office Action dated Jun. 29, 2018, 13 pages.
U.S. Appl. No. 14/213,360, Final Office Action dated Aug. 28, 2018, 21 pages.
U.S. Appl. No. 13/945,851 received a Non Final Office Action dated Sep. 21, 2018, all pages.
U.S. Appl. No. 13/945,851, Final Office Action dated Apr. 25, 2019, 16 pages.
U.S. Appl. No. 14/032,019, Non-Final Office Action dated May 2, 2019, 13 pages.
U.S. Appl. No. 14/213,360, Non-Final Office Action dated May 20, 2019, 20 pages.

\* cited by examiner

SYSTEM AND METHOD FOR UNIVERSAL, PLAYER-INDEPENDENT MEASUREMENT OF CONSUMER-ONLINE-VIDEO CONSUMPTION BEHAVIORS

CROSS-REFERENCE TO RELATED APPLICATIONS

The present application claims the benefit under 35 U.S.C. § 119(e) of U.S. Provisional Application Ser. No. 61/785,912, entitled "System and Method for Universal, Player-Independent Measurement of Consumer-Online-Video-Consumption Behaviors," filed on Mar. 14, 2013, the entire contents of which are incorporated herein by reference.

BACKGROUND OF THE INVENTION

1. Field of the Invention

The present invention relates to a system and methods for collecting and processing data regarding a consumer viewing (consumption) and attention to online video assets.

2. Description of the Related Art

The Internet and other types of on-line communication, especially by video, have become increasingly popular to the point where they now compete with traditional broadcast media for the attention of users.

Online video refers to a broad range of technologies by which web users can consume or view video content. Random measurements on whether a consumer has engaged a video are available, but due to complexities in technology, an advertiser (paying for the video, per play) or content producer cannot obtain metrics on video consumption except directly from the parties (companies) with a vested interest in demonstrating to others that the video content was effective. Yet, even then, it is difficult to obtain such metrics or measurements that reflect the extent of view engagement with video content.

Thus, there is a need in the market place for an independent measurement system to gauge video consumption (amount of video content viewed online). There is also a need for formulating a universal set of measurements or metrics that is operable across all video players, video-content types, ad (advertisement) networks, display devices, and browsers. It would be desirable for this set of measurement or metrics to operate consistently and equally well, regardless of the particular video player, video-content type, network, display devices, and browsers that are used to view online video content.

SUMMARY OF THE INVENTION

In one innovative aspect, the present invention provides a system that is an independent measurement system to gauge video consumption or viewing. In another innovative aspect, the present invention provides methods for formulating a universal set of measurements or metrics that is operable across all video players, video-content types, ad (advertisement) networks, display devices, and browsers. This set of measurement or metrics advantageously is configured to operate consistently and equally well, regardless of the particular video player, video-content type, network, display devices, and browsers that are used.

The present invention includes mechanisms designed and configured to be independent of the technology that is playing the particular video content that is being viewed. The present invention is directed to an agnostic solution that facilitates viewing of online video content on any and all types of player technology. In a further innovative aspect of the present invention, a standard set of metrics with respect to the video content being viewed or interacted with is generated regardless of the player and the environment in which a particular player is operating.

The present invention manifests in and is implemented by a system comprising several components, including a script configured to operate on a web page, an analytics server on the web (coupled via a network), to which data is provided by the script and is stored for analysis, and a dashboard for displaying results relating to the analysis to an interested entity (e.g. a user or other entity).

In some implementations, the script, once either, installed, downloaded, or embedded in a particular player of video content is configured to interrogate or make inquiries of the player of video content. In some implementations, the query may be to comprehend a "meaning" for particular user actions. In some implementations, the query may be to infer the "meaning" from aspects of design of the player. As one example, all players of video content have a "pause" button, and that button is universally recognized by a symbol involving parallel lines that used on most video playing devices. The present invention may in some implementations use image recognition to assist the script in determining the meaning of user actions with respect to a particular player (or playing device). Yet other implementations may include programming or instructions (e.g., software) in the script to determine whether the video content that was viewed is inside the viewable area of a screen of the video player, whether the sound is on, and whether the video content is being played for viewing.

The present invention is particularly beneficial, in instances where unscrupulous parties may serve video content for viewing with no sound, on auto play, or outside the viewable area of the screen. Most existing measurement systems are not able to detect these types of situations or scenarios, as a result of which advertisers providing advertising content within this video content do not receive the attention from viewers, for which they pay significant amounts of revenue.

The present invention is directed to a method implemented on one or more computing devices, for measuring engagement with video content playing on a plurality of different video players, comprising: identifying, by at least one of the one or more computing devices, a video player type displaying the video content; generating, by at least one of the one or more computing devices, a predetermined set of rules for each video player type; providing a measurement tag with the video content by at least one of the one or more computing devices, by wherein the measurement tag is configured to dynamically reconfigure itself to measure user engagement with the video content in accordance with the rules for each video player type.

BRIEF DESCRIPTION OF THE DRAWINGS

The present invention is illustrated by way of example, and not by way of limitation in the figures of the accompanying drawings in which like reference numerals are used to refer to similar elements.

DETAILED DESCRIPTION OF EMBODIMENTS

Figure 1:
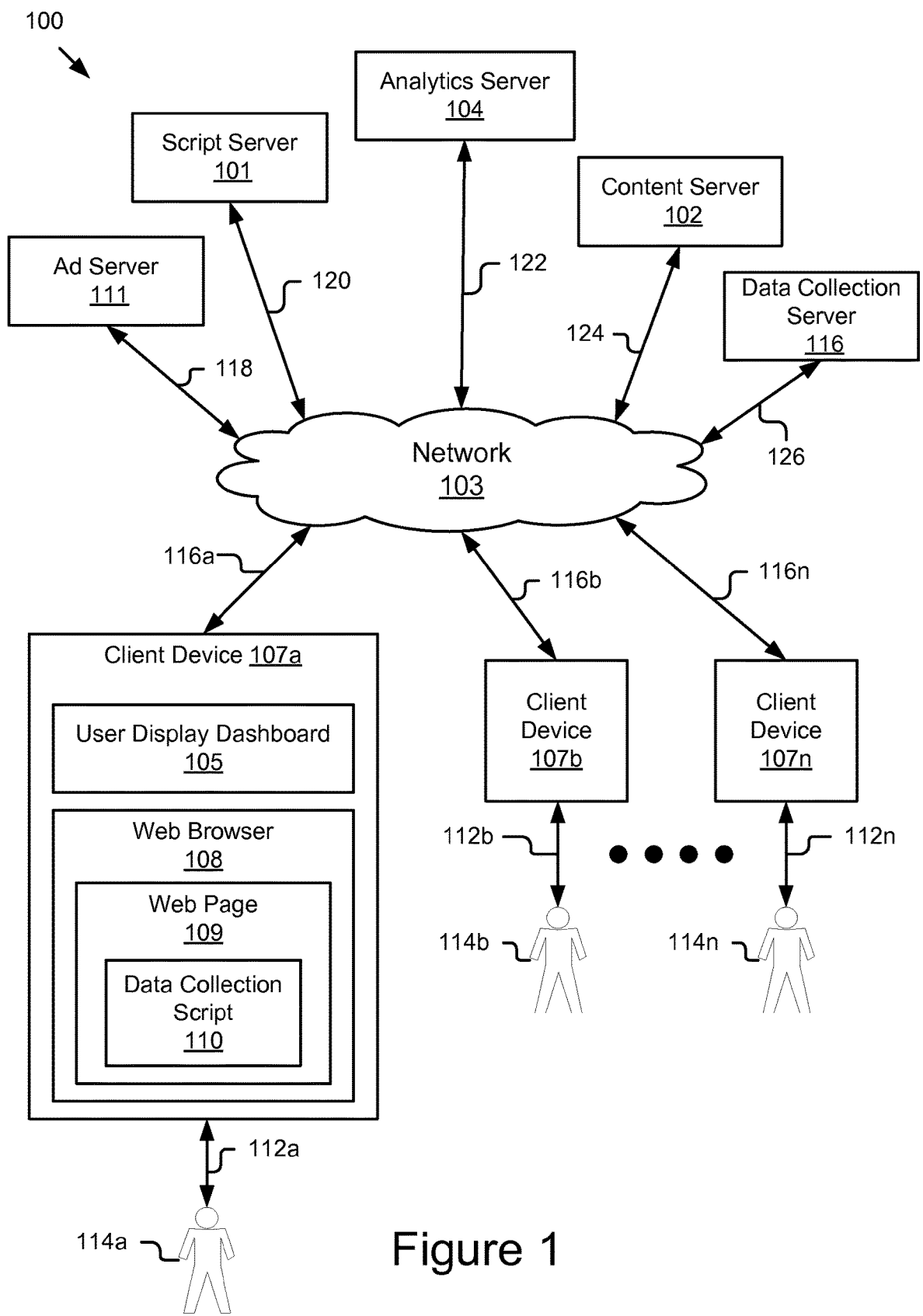
FIG. 1 is a block diagram illustrating an embodiment of an independent measurement system to gauge video consumption or viewing in accordance with the present invention.

FIG. 1 illustrates a block diagram of one embodiment of an independent measurement system 100 configured to gauge online video consumption or viewing by users. The system 100 provides mechanisms for formulating a universal set of measurements or metrics that is operable across all video players, video-content types, ad (advertisement) networks, display devices, and browsers. This set of measurement or metrics advantageously is configured to operate consistently and equally well regardless of the particular video player, video-content type, network, display devices, and browsers that are used.

The illustrated system 100 includes a script server 101, a content server 102, an ad server 111, an analytics server 104, a data collection server 116, and one or more client devices 107a-107n that are accessed by users indicated by reference numerals 114a-114n. In the illustrated embodiment, these entities are communicatively coupled via a network 103. Although only three client devices 107a-n are illustrated, it should be recognized that any number of client devices 107n are available to any number of users 114n. Furthermore, while only one network 103 is coupled to the script server 101, the content server 102, the analytics server 104, the ad server 111, the data collection server 111, and the one or more client devices 107a-107n, in practice any number of networks 103 can be connected to these entities. In one embodiment, the script server 101, the content server 102, the analytics server 104, the ad server 111, and the data-collection server 116 are hardware servers including a processor, memory, and network communication capabilities.

In the system 100, illustrated as a distributed and networked system, the script server 101 in some implementations provides a data collection script 110 that is configured to run on a web page 109 being rendered by a browser 108 on a client device 107 and collect information regarding playing of video content on the web page 109. The data collection script 110 collects the information and transmits it (or writes it) to the data-collection server 116 for the analytics server 104 or directly to the analytics server 104. In some embodiments, the video content is served by the content server 102. The information provided to the analytics server 104 is further processed by the analytics server 104 to yield indications of whether the viewer (user, client, or consumer) did in fact see the video content.

The user 114a-114n of the system 100 may access a user-display dashboard display 105, which displays various measures indicating the consumer or media behavior relevant to the question of whether attention was focused on the video content being played.

The system 100 and methods of the present invention described here either utilize or are operated on one or more computing systems (with one or more computers, processors, and data storage devices) that are configured to communicate in a distributed environment. In operation, a data collection script 110 is configured to run on the web page 109 being rendered by the browser 108 on a client device 107, 107b, or 107n and collects information regarding playing of video content on the web page 109. The data-collection script 110, when it begins executing, examines the web page 109 for the presence of video players. These may be indicated or identified either by the name of the player/object, the presence of video controls, or other factors or characteristics that inform about the video player.

Once particular players (devices of users, clients, consumers etc.) and video frames are identified, the data-collection script 110 begins to track all player (devices of users, clients, consumers etc.) input in the form of cursor, gesture, scrolling etc. The data-collection script 110 writes all or a subset of the data that it has collected to the analytics server 104. The analytics server 104 further processes the collected information to derive several metrics or measures relating to the environment, the user behavior, the media behavior, etc., that include but are not limited to the following examples: 1) percentage (%) that pause, 2) percentage (%) that seek, 3) percentage (%) that mute, 4) percentage (%) that change volume, 5) percentage (%) that starts playing (if it's click to play), 6) "in-view" rate, 7) "viewable playtime" buckets (percentage (%) of impressions where the video played for five (5) seconds, ten (10) seconds, fifteen (15) seconds, thirty (30) seconds, etc.), 8) percentage (%) completion (percentage (%) of impressions where the video played to the end), 9) viewable on video start, 10) active page dwell time, 11) mouse pause (in the event users stop moving their mouse on the page, but the page is still in-focus, then it may be concluded that the users are still viewing the video content), 12) "in-view," universal interaction, time to hover, scroll, and dwell/session time metrics, 13) player size, 14) percentage (%) of auto-play loads, 15) percentage (%) of non-auto-play loads that had a click-to-play, 16) percentage (%) of auto-play vs. click-to-play loads that had a pause, 17) percentage (%) of auto-play vs. click-to-play loads where video played to end, 18) percentage (%) of loads with a replay, 19) percentage (%) of loads with a rewind, 20) percentage (%) of loads with a fast-forward, 21) percentage (%) of loads that started out non-mute where user muted, 22) percentage (%) of loads that started out muted and then un-muted, 23) percentage (%) of loads where user expanded the video player.

For many examples described in the specification below, online video content may include any text, picture or video created and/or published by publishers on web pages, which are accessible to users. Furthermore, for many examples in the specification below, an online advertisement ("ad") is any text, picture or video whose purpose is advertising communication including any flash asset, any image of Internet Advertising Board (IAB) or industry standard width and height that is clickable including any recursion into iframes from the original page.

The system 100 advantageously gathers data or information by the data-collection script 110 that runs on each web browser 108 or application on any client or user's device 107a, 107b, or 107n. This data collection script 110 may be installed on each browser or application and is configured with a capability to track user input on the client device 107a, 107b, or 107n.

The network 103 is a conventional type, wired or wireless, and may have any number of configurations such as a star configuration, token ring configuration or other configurations. Furthermore, the network 103 may comprise a local area network (LAN), a wide area network (WAN) (e.g., the Internet), and/or any other interconnected data path across which multiple devices may communicate. In yet another embodiment, the network 103 may be a peer-to-peer network. The network 103 may also be coupled to or includes portions of a telecommunications network for sending data in a variety of different communication protocols. In yet another embodiment, the network 103 includes Bluetooth communication networks or a cellular communications network for sending and receiving data such as via short messaging service (SMS), multimedia messaging service (MMS), hypertext transfer protocol (HTTP), direct data connection, WAP, email, etc.

The client device 107a is representative of client devices 107a-107n and is a conventional type of computing device, for example, a personal computer, a hardware server, a laptop computer, a tablet computer, or smart phone, or any such device suitable for playing online video content. The client devices 107a-107n, are coupled to the network 103 by signal lines 116a, 116b-116n, respectively. In one embodiment, the client device 107 is coupled to receive (e.g., download or otherwise view) video content with or without online advertisements from the ad server 111 and other content from publishing sites or third party servers (not shown) but coupled in the illustrated distributed environment. The client device 107 includes the web browser 108 for presenting web pages 109 including online video content and advertisements to the user or client 114a, 114b, through 114n for viewing on their respective client devices 107a-107n. The web browser 108 on each of the client or user device 107a-107n presents advertisements and other online video content, and receives input from the user or client 114a-114n as represented by signal lines 112a-112n. The signal lines 112a-112n represent interactions of the users, 114a-114n, with their respective devices 107a-17n (e.g., viewing or manipulating tools to receive or control viewing of the online video content). The web browser 108 and the data collection script 110 are operable on the client devices 107a through 107n.

In one embodiment, the data collection script 110 may be embedded on the web browser 108 by the script server 101. In another embodiment, the data collection script 110 may be placed on the web browser 108 by the ad server 111. In yet another embodiment, the data collection script 110 may be embedded on the web browser 108 by the content server 102.

The script server 101 is a computer program running on a hardware system for providing one or more data collection scripts 110 (configured to determine or measure user behavior of visibility of online advertisement content) to web pages 109. For example, the script server 101 may be a web server that creates and provides data collection scripts 101 for publishers to place the scripts on web browsers 108. In one embodiment, the script server 101 may provide the data collection script 110 to a publisher that places the data collection script 110 on a web browser 108 that provides a web page containing content including advertisements for viewing by users or clients 114a-114n. In another embodiment, the ad server 111 is used to place the data collection script 110 on the web browser 108. In yet another embodiment, the content server 102 is used to place the data collection script 110 on the web browser 108. The script server 101 is coupled to the network 103, by signal line 120, for providing data collection scripts 110 to be placed on the web browsers 108.

The content server 102 is a computer program running on a hardware system for placing content on websites and/or placing the data collection script 110 on web pages 109. For example, the content server 102 may be a web server that provides the data collection script 110 for publishers to place the data collection script 110 on web browsers 108. The content server 102 is coupled to the network 103 by signal line 124 for communication with the other components of the system 100.

The analytics server 104 is a computer program running on a hardware system for receiving information transmitted by the data-collection scripts 110. The analytics server 104 is coupled to the network 103, by signal line 122, for communication with the other components of the system 100.

The ad server 111 is a computer program running on a hardware system for placing advertisements with video content on websites and/or placing the data collection script 110 on web pages 109. For example, the ad server 111 may be a web server that receives advertisements from the ad preparation server (not shown) or the advertising asset server (not shown) and delivers them to users or clients (114a-114n) or viewing websites. The ad server 111 is coupled to the network 103 by signal line 118 for receiving ads from the ad preparation server or the advertising asset server (not shown) and for delivering the ads to third party servers, sites or domains (not shown).

The data-collection server 116 is a computer program running on a hardware system for collecting data flow of information that is obtained by the data collection scripts 110. For example, the data collection server 116 may be a web server that receives and gathers information from various components in the distributed environment. The data-collection server 116 is coupled to the network 103, by signal line 126, for communication with the other components of the system 100.

Figure 2A:
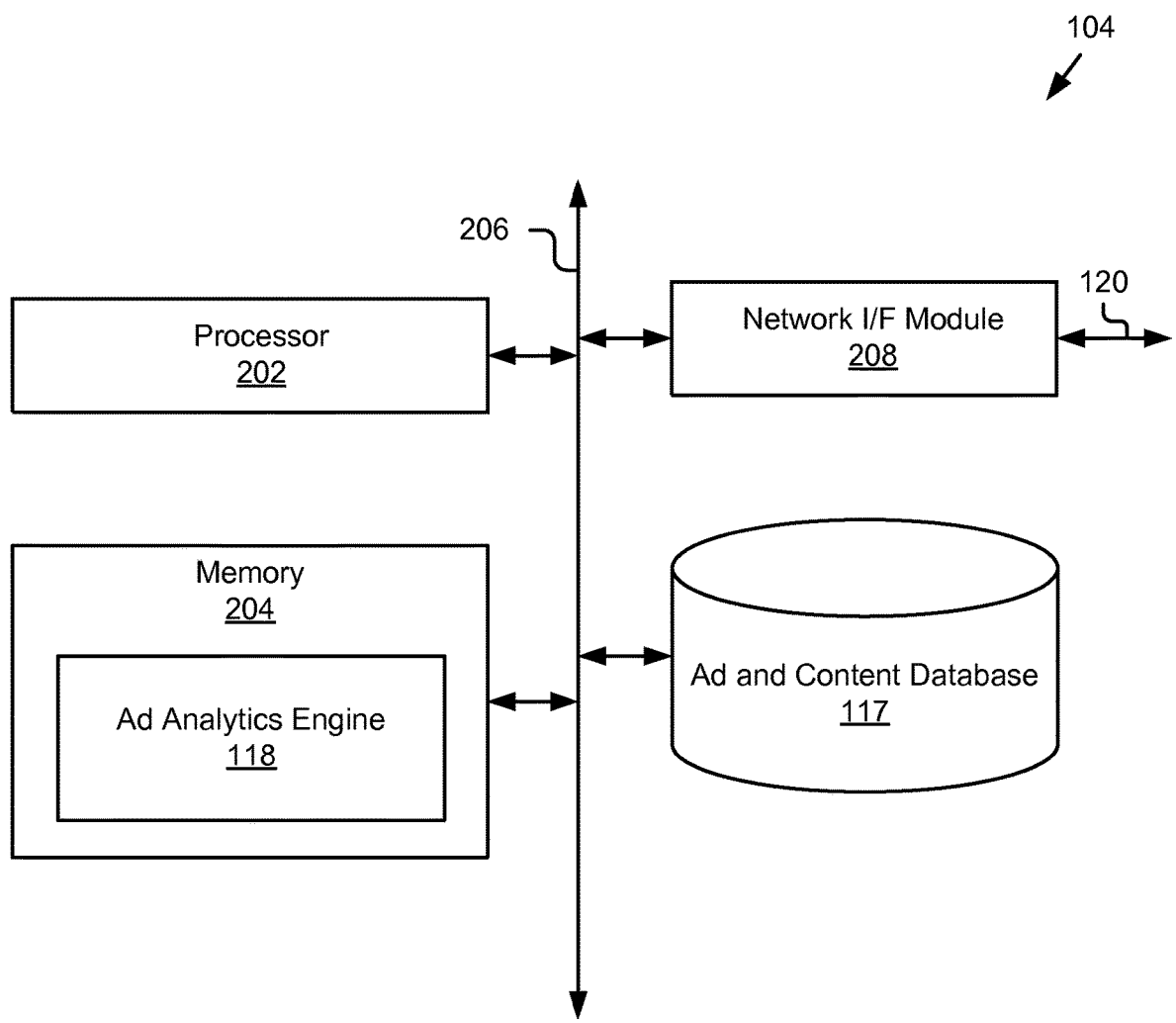
FIG. 2A is a block diagram illustrating various hardware components of an example analytics server in accordance with the present invention.

FIG. 2A is a block diagram of example hardware components of the analytics server 104 (or a server dedicated to determine or measure user viewing of video content on web-connected devices). In this embodiment, the analytics server 104 comprises: a processor 202, memory 204 with an ad-analytics engine 118, a network I/F module 208, an ad-and-content database 117, and a bus 206. The processor 202 comprises an arithmetic logic unit, a microprocessor, a general-purpose controller or some other processor array to perform computations and provide electronic display signals to a display device. The processor 202 is coupled to the bus 206 for communication with the other components via a signal line. The processor 202 processes data signals and may comprise various computing architectures including a complex instruction set computer (CISC) architecture, a reduced instruction set computer (RISC) architecture, or an architecture implementing a combination of instruction sets.

Although only a single processor is shown in FIG. 2, multiple processors may be included. Other processors, operating systems, sensors, displays and physical configurations are possible.

The memory 204 stores instructions and/or data that may be executed by the processor 202. The memory 204 is coupled to the bus 206 via a signal line for communication with the other components via a signal line. The instructions and/or data may comprise code for performing any and/or all of the techniques described herein. The memory 204 may be a dynamic random access memory (DRAM) device, a static random access memory (SRAM) device, flash memory or some other memory device.

The network I/F module 208, as illustrated, is coupled to network 103, by a signal line 120, and is coupled to the bus 206. The network The network I/F module 208 includes ports for wired connectivity such as but not limited to USB, SD, or CAT-5, etc. The network I/F module 208 links the processor 202 to the network 103 that may in turn be coupled to other processing systems. The network I/F module 208 is configured to provide other connections to the network 103 using standard network protocols such as TCP/IP, HTTP, HTTPS and SMTP. In other embodiments, the network I/F module 208 includes a transceiver for sending and receiving signals using Wi-Fi, Bluetooth® or cellular communications for wireless communication. The network interface (I/F) module 208 provides a communication path for the components of the client device 107a-n to the network 103 and other systems.

The ad-and-content database 117 is data storage for storing content and other data as illustrated in further detail with reference to FIG. 7. The ad-and-content database 117 is coupled to the bus 206. The ad-and-content storage 117 stores data, information and instructions used by the processor 202. Such stored information includes information about video content, consumer-or-media behavior, universal set of measurements and/or metrics and other information. In one embodiment, the ad-and-content storage 117 stores data received by the processor 202 as well as data generated during intermediate processes. In one embodiment, the ad-and-content database 117 is of conventional type. The ad-and-content database 117 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The ad-and-content database 117 is coupled by the bus 206 via a signal line for communication with other components. The ad-and-content database 117 will be described in further detail below with reference to FIG. 7.

Figure 2B:
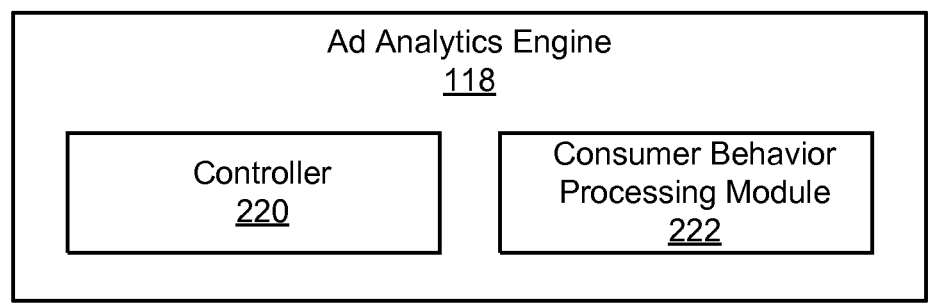
FIG. 2B is a block diagram illustrating various software components of the example analytics server in accordance with the present invention.

FIG. 2B is a block diagram illustrating example software components of the an analytics engine 118 of the analytics server 104, including a controller 220 and a consumer-behavior-processing module 222.

The controller 220 is software, code or routines for handling communications between the ad analytics engine 118 and other components of the analytics server 104. For example, the controller 220 is coupled to receive data from the data collection script 110 and deliver the data to one or more other modules of the ad analytics engine 118, e.g., the consumer-behavior-processing module 222. In one embodiment, the controller 220 receives communication data from one or more other modules of the measurement engine 118 and sends, via the network I/F module 208 (FIG. 2A), the communication data to the next entity. The controller 220 is coupled to the bus 206 (FIG. 2A) for communications with other components of the statistical analytics server 104.

The consumer-behavior-processing module 222 is software, code or routines for assessing the data that is received. The consumer-behavior-processing module 222 is coupled by the network 103 to one or more client devices 107a-107n and thus one or more data collection scripts 110. Each of the one or more data collection scripts 110 sends data to the ad analytics engine 118 and the data is transmitted to the consumer-behavior-processing module 222 via the controller 220. In some embodiments, the consumer-behavior-processing module 222 processes the data.

Figure 3A:
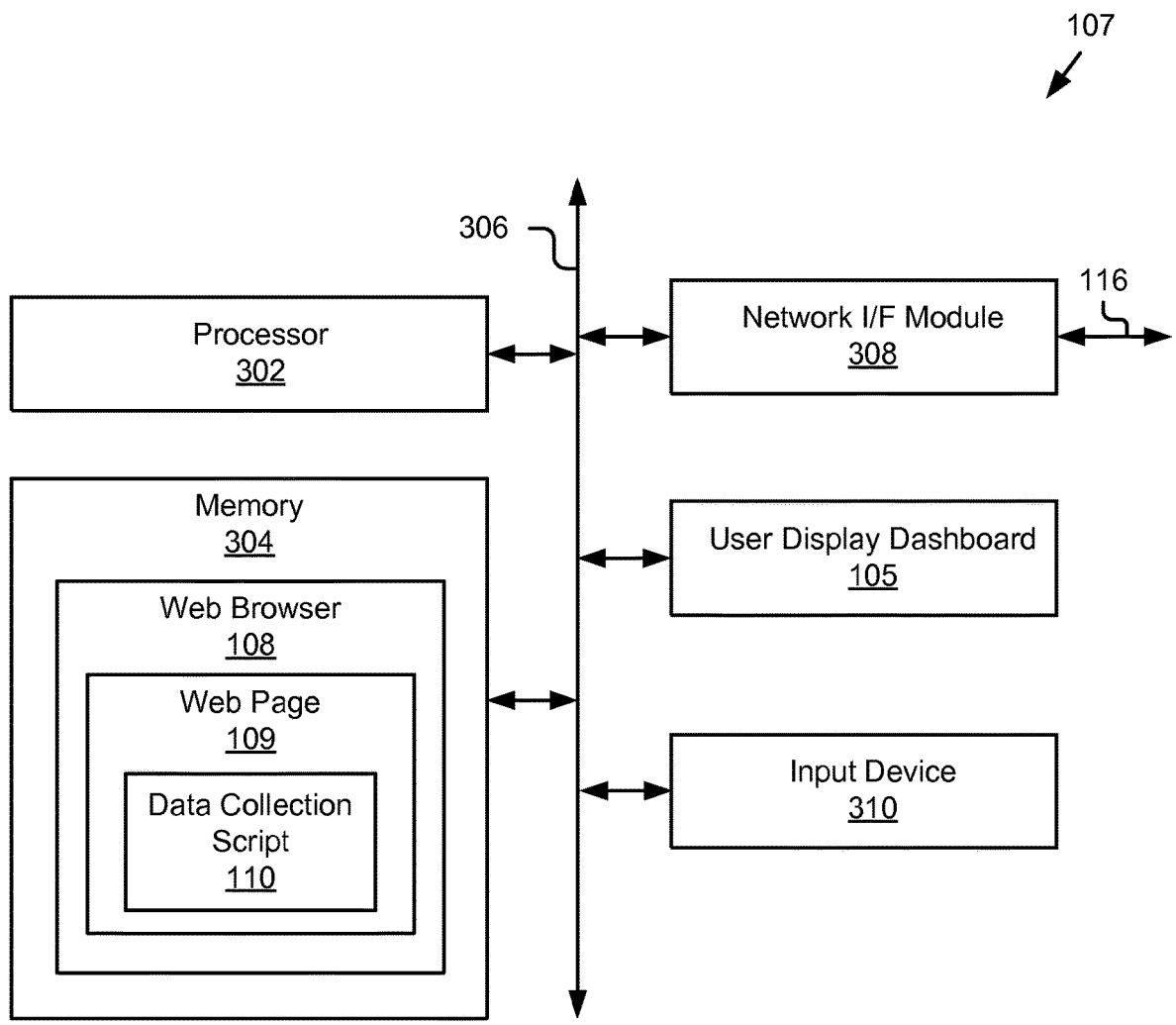
FIG. 3A is a block diagram illustrating various hardware/software components of an example client device.

Referring now to FIG. 3A, example hardware and software components of an example client device 107a-107n are illustrated. An example client device 107a-107n may be of conventional type, a computing device for viewing online video, for example, a personal computer, a hardware server, a laptop computer, a tablet computer or smart phone. The client devices 107a-107n, are coupled to the network 103 by signal lines 116. The client devices 107a-107n include a processor 302, memory 304, a network I/F module 308, a user-display dashboard 105 (FIG. 1) on which online video content is displayed to clients or users 114a-114n to view, and an input device 310, via which data for the user-display dashboard 105 is received.

In one implementation, the client device 107 is coupled to receive video content with or without online advertisements from the ad server 111 and other content from publishing sites or third party servers (not shown). The client device 107 includes the web browser 108 for presenting web pages 109 including online content and advertisements to the user or client 114a, 114b, through 114n. The web browser 108 on each of the client or user device 107a-107n presents advertisements and other video content, and receives input from the user or client 114a-114n. The web browser 108 and the data collection script 110 on the web page 109 are operable on the client devices 107a through 17n. In one embodiment, the data collection script 110 may be embedded on the web browser 108 from the script server 101. In another embodiment, the data collection script 110 may be placed on the web browser 108 by the ad server 111. In yet another embodiment, the data collection script 110 may be embedded on the web browser 108 by the content server 102.

The processor 302 comprises an arithmetic logic unit, a microprocessor, a general-purpose controller or some other processor array to perform computations and provide electronic display signals to a display device. The processor 302 is coupled to the bus 306 for communication with the other components via a signal line. The processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. Other processors, operating systems, sensors, displays and physical configurations are possible.

The memory 304 stores instructions and/or data that may be executed by the processor 302. The memory 304 is coupled to the bus 306 via a signal line for communication with the other components via a signal line. The instructions and/or data may comprise code for performing any and/or all of the techniques described herein. The memory 304 may be a dynamic random access memory (DRAM) device, a static random access memory (SRAM) device, flash memory or some other memory device.

The network I/F module 308 is coupled to network 103 by a signal line 116 (a-n) and coupled to the bus 306. The network I/F module 308 includes ports for wired connectivity such as but not limited to USB, SD, or CAT-5, etc. The network I/F module 308 links the processor 302 to the network 103 that may in turn be coupled to other processing systems. The network I/F module 308 is configured to provide other connections to the network 103 using standard network protocols such as TCP/IP, HTTP, HTTPS and SMTP. In other embodiments, the network I/F module 308 includes a transceiver for sending and receiving signals using Wi-Fi, Bluetooth® or cellular communications for wireless communication. The network interface (I/F) module 308 provides a communication path for the components of the client device 107a-n to the network 103 and other systems.

Figure 3B:
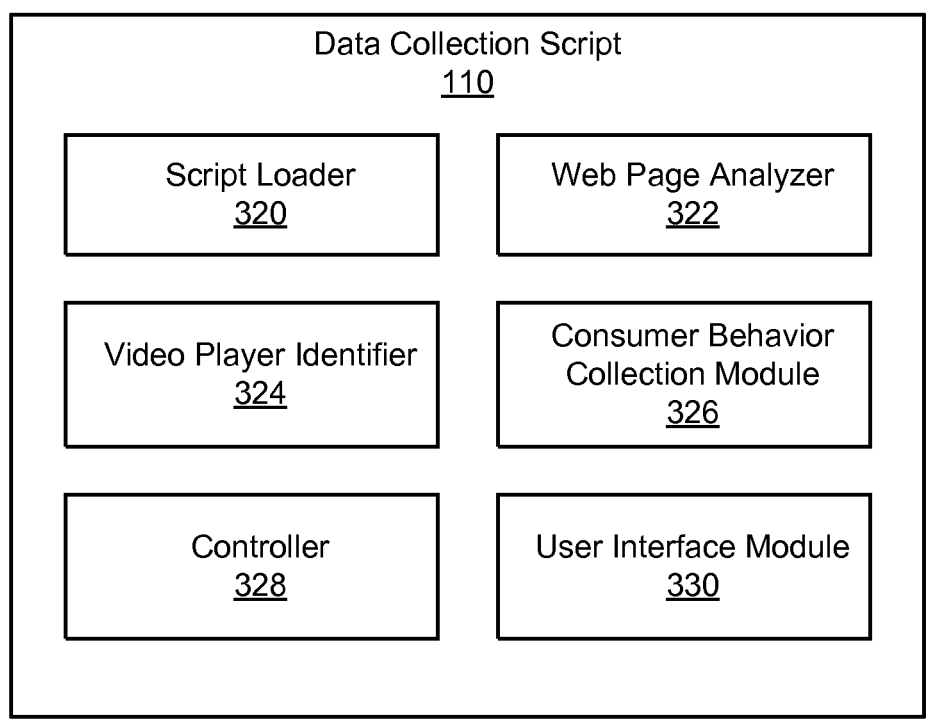
FIG. 3B is a block diagram illustrating an example data collection script.

Referring now to FIG. 3B, an example data collection script 110 is described in further detail. In the illustrated embodiment, the data collection script 110 comprises a script loader 320, a web-page analyzer module 322, a video-player module 324, a consumer-behavior-collection module, a controller 328 and a user-interface module 330. As noted above, the data collection script 110 is placed by a publisher or other entity on the web browser 108 of the client device 107 from one of the script server 101, the content server 102 and the ad server 111. For example, the client device 107 is used by a user 114 to run a web browser 108 for opening a web page 109. The data collection script 110 is placed on the web browser 108 to collect sample data.

The script loader 320 is software, code or routines for loading the data-collection script 110. For example, the script loader 320 is coupled to receive a signal indicating that a web page 109 is rendered from the web browser 108 and configured to deliver the signal to one or more entities that may be configured to load the data collection script 110. As indicated above, in operation, the data collection script 110 configured to run on a web page 109, renders in the browser 108 on a client device 107 a-n. It may be loaded by the script server 101, and begins to execute. The data-collection script 110 is configured to determine the presence of a video player.

The web-page analyzer module 322 is software, code, or routines for analyzing the web-page, once the data-collection script 110 is loaded. The web-page analyzer module 322 is coupled to receive a signal indicating that a web page 109 is rendered and coupled to determine video media and consumer behavior relative to the video content on the webpage 109. In some implementations, the script loader 320 loads the data-collection script 110 from a script server 101 and begins to execute. The web-page analyzer module 322 of the data-collection script 110 first video content of interest on the web page 109. These could be advertisements or video content elements.

The video-player identifier 324 is software, code or routines for identifying the type of video player. In some implementations, the video-player identifier 324 identifies particular players (devices of users, clients, consumers etc.) and video frames of video content being played on particular video devices.

The consumer-behavior-collection module 326 is software, code or routines for managing the flow of data to provide data to the analytic server 104. The controller 328 is software, code or routines for controlling the communications. The user-interface module 330 is software, code or routines for providing the necessary interface. Once particular players (users, clients, consumers etc.) and video frames are identified, the consumer-behavior-collection module 326 of the data-collection script 110 begins to track all player (users, clients, consumers etc.) input in the form of cursor, gesture, scrolling etc. The data-collection script 110 writes all or a subset of the data that it has collected to the analytics server 104. The analytics server 104 further processes the collected information to derive several metrics or measures relating to the environment, the user behavior, the media behavior, etc., that include but are not limited to the following examples: 1) percentage (%) that pause, 2) percentage (%) that seek, 3) percentage (%) that mute, 4) percentage (%) that change volume, 5) percentage (%) that starts playing (if it's click-to-play), 6) "in view" rate, 7) "viewable playtime" buckets (percentage (%) of impressions where the video played for five (5) seconds, ten (10) seconds, fifteen (15) seconds, thirty (30) seconds, etc.), 8) percentage (%) completion (percentage (%) of impressions where the video played to the end), 9) viewable on video start, 10) active page dwell time, 11) mouse pause (in the event users stop moving their mouse on the page, but the page is still in-focus, then it may be concluded that the users are still viewing the video content), 12) "in-view," universal interaction, time to hover, scroll, and dwell/session time metrics, 13) player size, 14) percentage (%) of auto-play loads, 15) percentage (%) of non-auto-play loads that had a click-to-play, 16) percentage (%) of auto-play vs. click-to-play loads that had a pause, 17) percentage (%) of auto-play vs. click-to-play loads where video played to end, 18) percentage (%) of loads with a replay, 19) percentage (%) of loads with a rewind, 20) percentage (%) of loads with a fast-forward, 21) percentage (%) of loads that started out non-mute where user muted, 22) percentage (%) of loads that started out muted and then un-muted, and 23) percentage (%) of loads where user expanded the video player.

Figure 4:
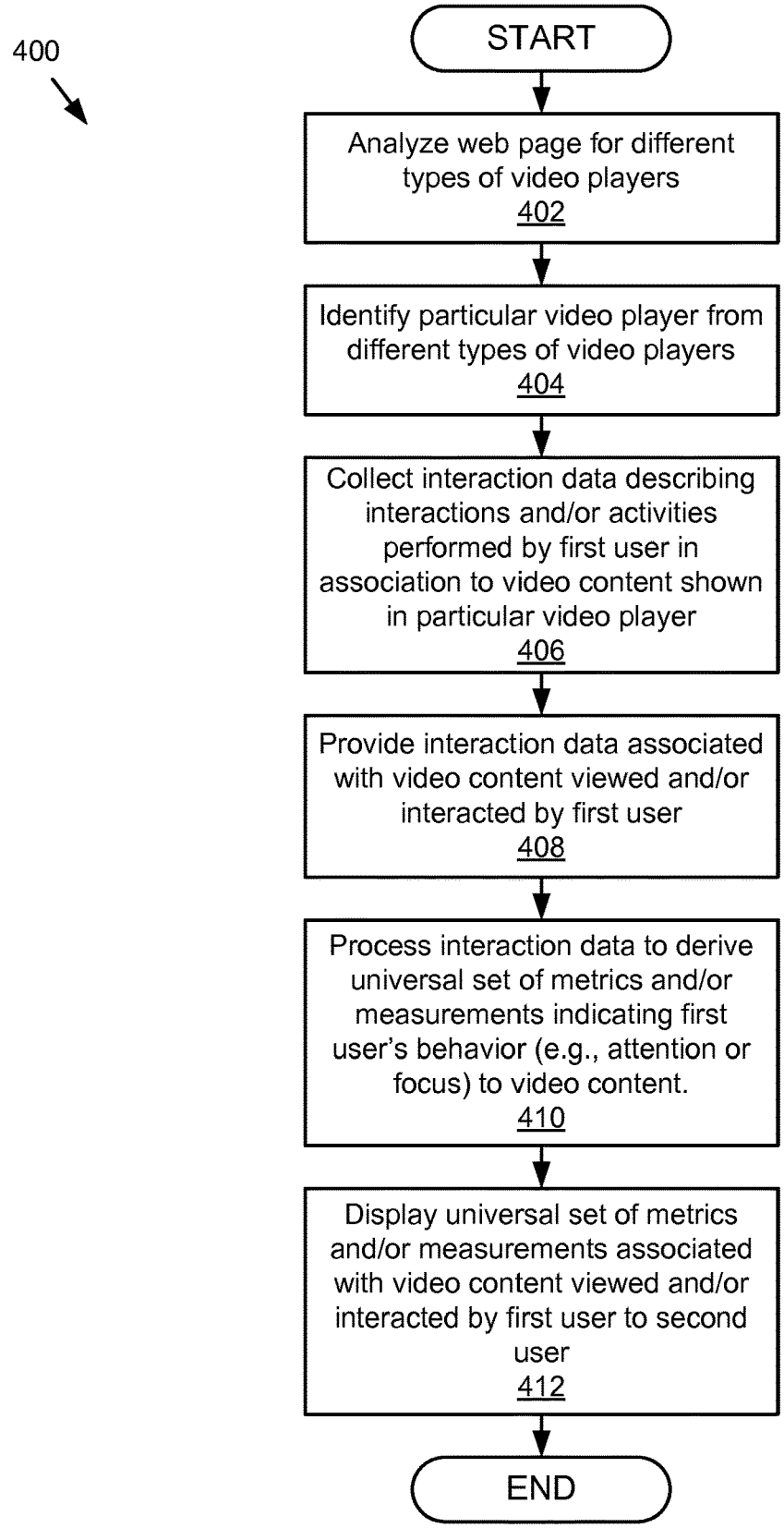
FIG. 4 is a flowchart of an example general method for formulating a universal set of measurements or metrics that is operable across all video players, video-content types, ad (advertisement) networks, display devices, and browsers.

Referring now to FIG. 4, one embodiment of a general method 400 in accordance with, the present invention is illustrated. The method 400 begins with one or more operations designated by block 402, for analyzing web pages or different video players. For example, once the web browser 108 renders a web page 109, the data collection script 110 begins to execute and receives a signal indicating that a web page 109 is rendered. The method 400 continues by one or more operations for identifying the type of video player for different players (particular video playing device used by each player), as indicated by block 404. The method 400 proceeds and in accordance with one or more operations designated by block 406 collects interaction data describing interactions and/or activities performed by a first user in association to video content shown in the particular video player. The method 400 proceeds to the next block 408 of one or more operations for providing interaction data associated with video content viewed and/or interacted by the first user (any one of the users illustrated in FIG. 1). The method 400 continues to block 410 including one or more operations for processing interaction data to derive universal set of metrics and/or measurements indicating a first user's behavior (e.g., attention or focus) to video content that the viewer is consuming. The method proceeds to the next block 412 including one or more operations for displaying a universal set of metrics and/or measurements associated with the video content viewed and/or interacted with by the first user to a second user (or other users). The method proceeds to an indication of "END," which is simply to illustrate an end to the sequence of operations described above. It should be recognized that the method 400 described is by way of example and it may either include additional operations not described here or exclude any of the operations that are described.

Figure 5:
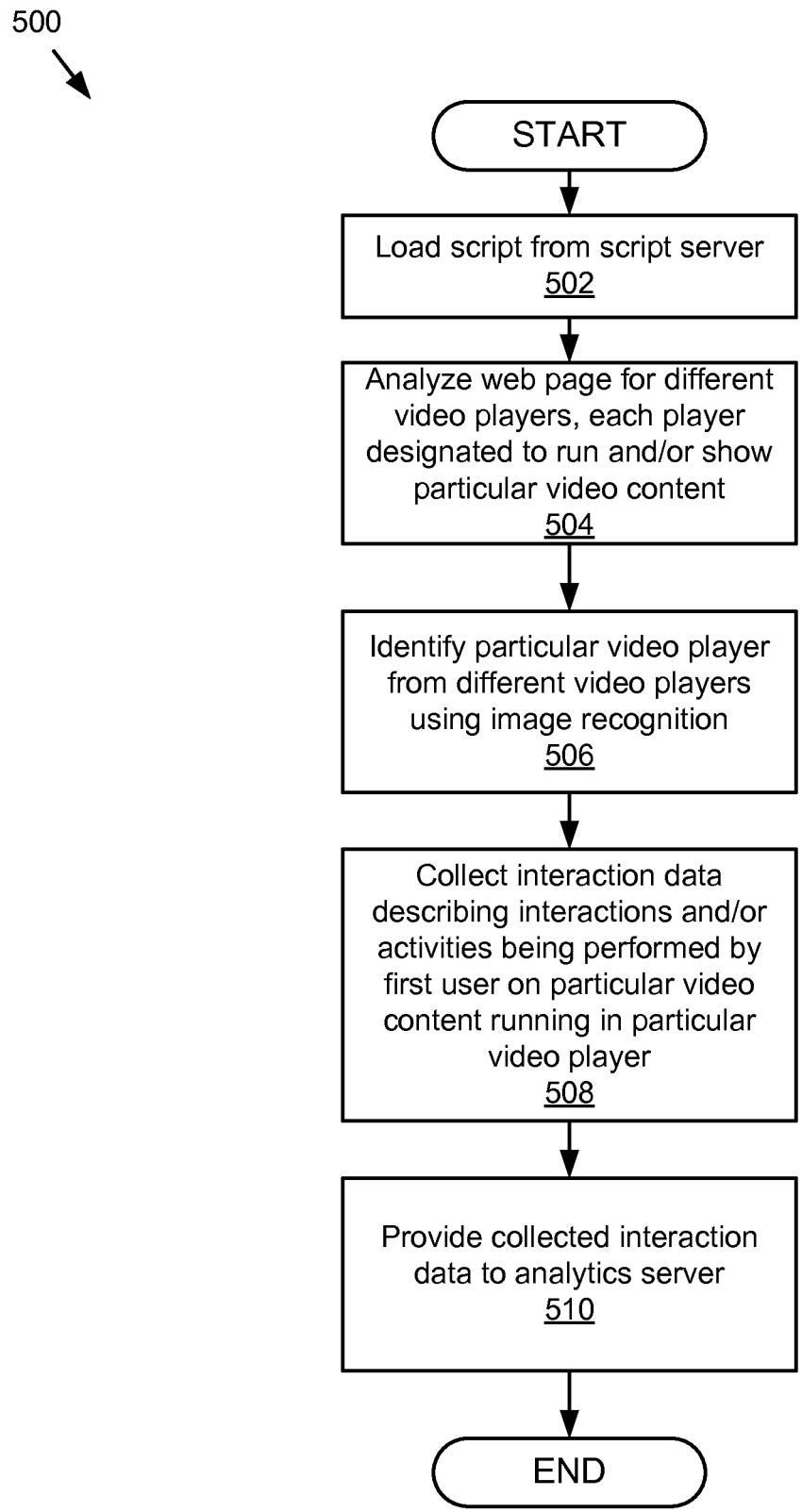
FIG. 5 is a flowchart illustrating an example method for collecting data on user/consumer behavior associated with viewing of online video content on a particular video player type.

Referring now to FIG. 5, an example method 500 illustrating the method for collecting data reflecting user/consumer behavior on how it engages video content running on a particular video player is illustrated and described. The method 500 begins by one or more operations designated by block 502 for loading a script (e.g., data collection script 110) from a script server (e.g., script server 101). The method 500 proceeds to the next block 504, including one or more operations for analyzing a web page for different video players, each player designated to run or show particular video content. The method 500 proceeds to the next block 506, including one or more operations for identifying particular video players (or video playing devices) from a plurality of different types of video players, using for example image recognition, among other techniques. The method 500 proceeds to a block 508, including one or more operations for collecting interaction data describing interactions and/or activities being performed by the first user on the particular video content running on a particular video player. The method 500 proceeds to the next block 510 including one or more operations for providing collected interaction data to the analytics server 104. The method 500 proceeds to an indication of "END," which is simply to illustrate an end to the sequence of operations described above. It should be recognized that the method 400 described is by way of example and it may either include additional operations not described here or exclude any of the operations that are described.

Figure 6:
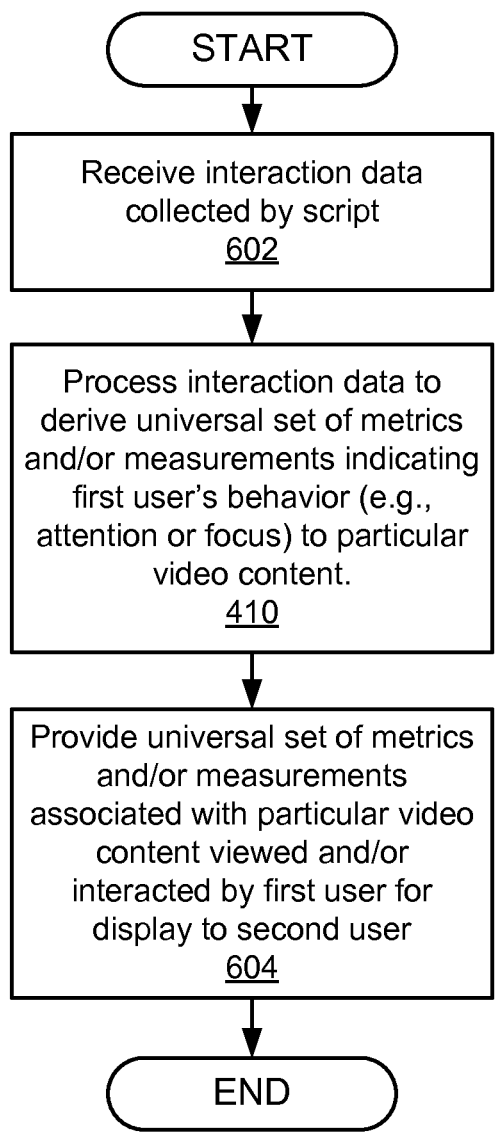
FIG. 6 is a flowchart illustrating an example method for processing consumer behavior and deriving universal set of metrics and/or measurements in accordance with the present invention.

Referring now to FIG. 6, an example method 600 illustrating the method for processing the consumer behavior and deriving a set of universal metrics and measurement is described. The method 600 begins and proceeds to a block 602 including one or more operations for receiving interaction data collected by the data-collection script 110. The method 600 proceeds to the next block 410 (as illustrated in FIG. 4) for processing user interaction data to derive universal set of metrics and/or measurements indicating a first user's behavior (e.g. attention or focus) to particular video content. The method 600 proceeds to the next block 604 including one or more operations for providing a universal set of metrics and/or measurements associated with particular video content viewed and/or interacted with by the first user for display to a second user.

Figure 7:
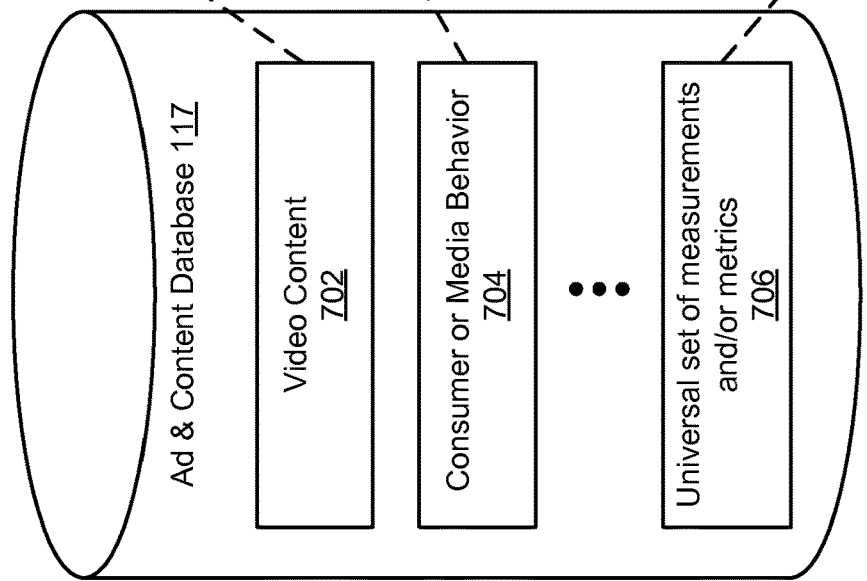
FIG. 7 is a block diagram illustrating one embodiment of data storage in accordance with the present invention.

Referring now to FIG. 7, one embodiment of an ad-and-content database 117 in accordance with the present invention is illustrated and described. The ad-and-content database 117 is data storage for storing video data 702, consumer-or-media behavior 704, and a universal set of measurements and/or metrics 706. Examples of these types of data are illustrated in FIG. 7. Examples of video data 702 include online video advertisements, video clips, video tutorials, video lectures, movies, and/or other video content present on a web page. Examples of consumer-or-media behavior 704 include a percentage of players that pause; percentage that seek; percentage that mute; percentage that change volume; percentage that start playing (if it's click-to-play); in-view rate; viewable playtime buckets (percentage of impressions where the video played for five (5) seconds, ten (10) seconds, fifteen (15) seconds, thirty (30) seconds, etc.); percentage completion (percentage of impressions where the video played to the end); viewable on video start; active page dwell time; mouse pause (if the users stop moving their mouse on the page, but the page is still in-focus, then it can be assumed that maybe they are still watching the video); in-view, universal interaction, time to hover, scroll, and dwell/session time metrics; player size; percentage of auto-play loads, percentage of non-auto play loads that had a click-to-play; percentage of auto-play vs. click-to-play loads that had a pause; percentage of auto-play vs. click-to-play where video played to end; percentage of loads with a replay; percentage of loads with a rewind; percentage of loads with a fast-forward; percentage of loads that started out non-mute where user mutes; percentage of loads that started out muted where user un-mutes; and percentage of loads where user expanded the video player. Examples of universal set of metrics and measurements that are formulated may include, but are not limited to, metrics or measurements for indicating a consumer or media behavior relevant to the question of whether attention was focused on a particular video content viewed by the consumer. These universal set of measurements and/or metrics function equally well across all video players, video-content types, ad (advertisement) networks, display devices, and browsers.

Systems and methods for collecting and processing data regarding consumer viewing or consumption and user attention to online video assets on web-connected devices are described here. The systems and methods determine indications of attention to or engagement with online video advertising or content both within servers, and on network connections. The system and methods also formulate a set of measurement or metrics that are advantageously configured to operate consistently and equally well regardless of the particular video player, video-content type, network, display devices, and browsers that are used. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of the Internet and on-line advertising; however, the disclosed technologies apply to other types of advertising.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method implemented on one or more computing devices, for measuring engagement with video content playing on one or more video players, comprising:
    receiving, by a client device, a data collection script configured to collect information regarding web content output by a web browser;
    executing, by the client device, the data collection script, wherein the execution of the data collection script on the client device causes the client device to:
        (a) detect a presence of one or more video players, including a first video player executing within the web browser and playing first video content, based on an analysis of the web content output by the web browser executing on the client device;
        (b) using image recognition to identify a particular video player type of the first video player executing within the web browser and playing first video content, from a plurality of different types of video players;
        (c) retrieve a predetermined set of rules based on the identified particular video player type determined for the executing first video player, wherein different predetermined sets of rules are associated with each of the plurality of different video player types;
        (d) track user interaction with the first video player executing within the web browser; and
        (e) determine one or more user activities performed with respect to the first video content, wherein the user activities are determined based on the predetermined set of rules associated with the identified particular video player type; and
    transmitting at least a part of the determined one or more user activities performed with respect to the first video content, to an analytics server.

2. The method according to claim 1, wherein the first video content includes advertising.

3. The method of claim 1, wherein the data collection script is configured to operate on a web page having video content rendered by the web browser via the first video player by which a particular user views the video content.

4. A non-transitory computer-program product for measuring engagement with video content playing on a plurality of different video players, the computer-program product comprising a computer-usable medium including a computer-readable program, wherein the computer-readable program when executed on a computer causes the computer to:
receive a data collection script configured to collect information regarding web content output by a web browser on the computer; execute the data collection script, wherein the execution of the data collection script on the computer causes the computer to:
(a) detect a presence of one or more video players including a first video player executing within the web browser and playing first video content, based on an analysis of the web content output by the web browser executing on the computer;
(b) using image recognition to identify a particular video player type of the first video player executing within the web browser and playing first video content, from a plurality of different types of video players;
(c) retrieve a predetermined set of rules based on the identified particular video player type determined for the executing first video player, wherein different predetermined sets of rules are associated with each of the plurality of different video player types;
(d) track user interaction with the first video player executing within the web browser; and
(e) determine one or more user activities performed with respect to the first video content, wherein the user activities are determined based on the predetermined set of rules associated with the identified particular video player type; and
transmit at least a part of the determined one or more user activities performed with respect to the first video content, to an analytics server.

5. The non-transitory computer-program product of claim 4, wherein the first video content includes advertising.

6. The non-transitory computer-program product of claim 4, wherein the data collection script is configured to operate on a web page having video content rendered by the web browser via the first video player by which a particular user views the video content.

7. A system for measuring engagement with video content playing on a plurality of different video players, comprising:
a processor; and
a memory storing instructions that when executed cause the processor to:
receive a data collection script configured to collect information regarding web content output by a web browser on the system;
execute the data collection script, wherein the execution of the data collection script causes the system to:
(a) detect a presence of one or more video players including a first video player executing within the web browser and playing first video content, based on an analysis of the web content output by the web browser executing on the system;
(b) using image recognition to identify a particular video player type of the first video player executing within the web browser and playing first video content, from a plurality of different types of video players;
(c) retrieve a predetermined set of rules based on the identified particular video player type determined for the executing first video player, wherein different predetermined sets of rules are associated with each of the plurality of different video player types;
(d) track user interaction with the first video player executing within the web browser; and
(e) determine one or more user activities performed with respect to the first video content, wherein the user activities are determined based on the predetermined set of rules associated with the identified particular video player type; and
transmit at least a part of the determined one or more user activities performed with respect to the first video content, to an analytics server.

8. The system of claim 7, wherein the first video content includes advertising.

9. The system of claim 7, wherein the data collection script is configured to operate on a web page having video content rendered by the web browser via the first video player by which a particular user views the video content.

10. The method of claim 1, wherein using image recognition to identify the particular video player type comprises:
using the image recognition to identify a product name of the first video player within the web content output by the web browser.

11. The method of claim 1, wherein using image recognition to identify the particular video player type comprises:
using the image recognition to detect a presence of video controls of the first video player within the web content output by the web browser.

12. The method of claim 1, further comprising:
executing instructions within the data collection script to determine whether the first video content is being played by the first video player outside of a viewable area of a screen of the client device.

13. The method of claim 1, further comprising:
executing instructions within the data collection script to determine whether the first video content being played is being played by the first video player with sound on or with sound off.

14. The method of claim 1, further comprising:
executing instructions within the data collection script to determine whether the first video content is loaded but is not being actively played by the first video player.

15. The system of claim 7, wherein using image recognition to identify the particular video player type comprises:
using the image recognition to identify a product name of the first video player within the web content output by the web browser.

16. The system of claim 7, wherein using image recognition to identify the particular video player type comprises:
using the image recognition to detect a presence of video controls of the first video player within the web content output by the web browser.

17. The system of claim 7, wherein execution of the data collection script further causes the system to:
determine when the first video content being played is being played outside of a viewable area of a screen of the system.

18. The system of claim 7, wherein execution of the data collection script further causes the system to:
determine when the first video content being played is being played by the first video player with sound off.

19. The system of claim 7, wherein execution of the data collection script further causes the system to:

determine when the first video content is loaded but is not being actively played by the first video player.

* * * * *